H. A. BEALL.
BURGLAR ALARM FOR AUTOMOBILES.
APPLICATION FILED MAR. 16, 1917.
1,268,915.
Patented June 11, 1918.
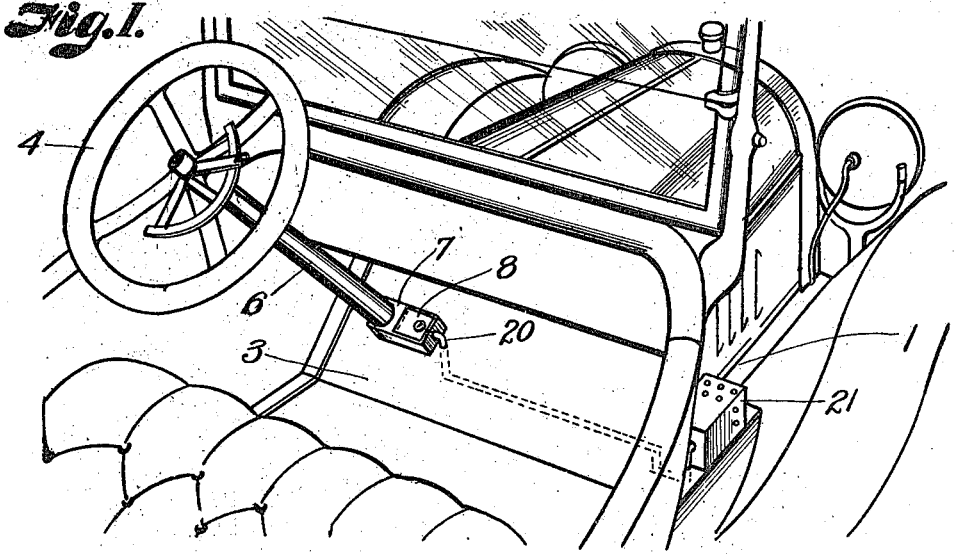
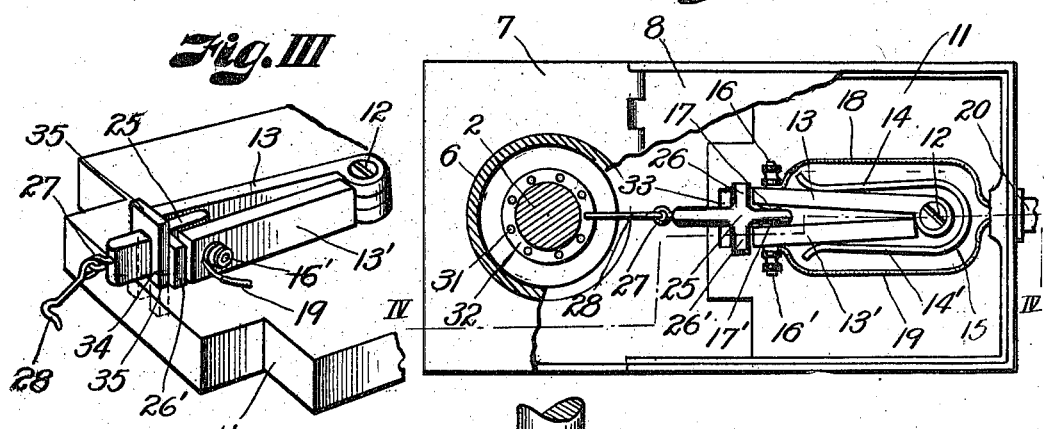
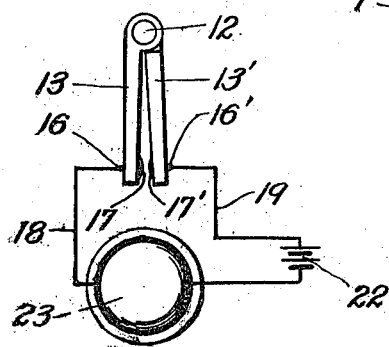
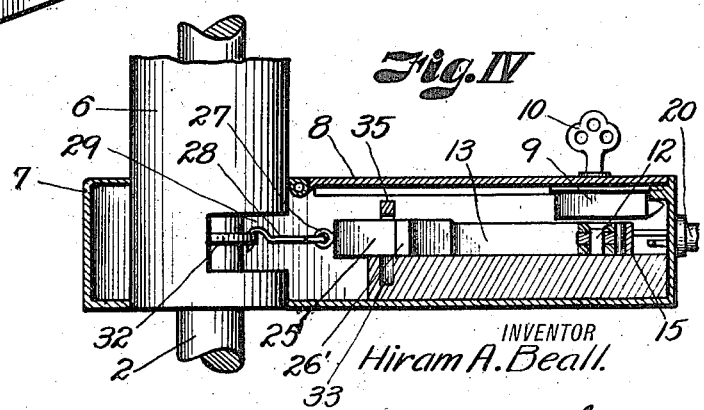
INVENTOR
Hiram A. Beall.
BY
Arthur C. Brown
ATTORNEY

UNITED STATES PATENT OFFICE.

HIRAM A. BEALL, OF KANSAS CITY, MISSOURI.

BURGLAR-ALARM FOR AUTOMOBILES.

1,268,915.   Specification of Letters Patent.   Patented June 11, 1918.

Application filed March 16, 1917.  Serial No. 155,255.

*To all whom it may concern:*

Be it known that I, HIRAM A. BEALL, a citizen of the United States, residing at Kansas City, in the county of Jackson and State of Missouri, have invented certain new and useful Improvements in Burglar-Alarms for Automobiles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to burglar or theft alarms for automobiles or like vehicles, and has for its principal object to provide simple and effective means for sounding an alarm should anyone unauthorized attempt to gain use of a vehicle equipped with the device.

In accomplishing this object, I have provided improved details of structure the preferred forms of which are illustrated in the accompanying drawings, wherein:

Figure I is a perspective view illustrating the interior of an automobile body and the mounting of signaling or alarming mechanism according to the present invention.

Fig. II is a sectional view of the steering post and its housing, taken in a plane perpendicular thereto, showing the switch housing, a part of the top of which is broken away to show the switch parts and the switch key connection with the steering post.

Fig. III is a detail perspective view showing the pivotal mounting of the switch arms and the switch key locked therebetween.

Fig. IV is a vertical section on the line III—III, Fig. II.

Fig. V is a diagrammatic view of the wiring of the contact points with a battery and alarming device.

Referring more in detail to the drawings:

1 designates a portion of an automobile which may be of any ordinary type, having a steering post 2, a dash or foot board 3 and steering wheel 4.

Mounted on the foot board 3 and inclosing the lower end of the steering post 2 and its tubular housing 6 is a casing, or box 7, of substantial sheet metal construction having a door 8 hinged on its upper face which may be opened to permit the setting or the disconnection of the alarm switch parts and may be held closed by a suitable lock 9 operable by a key 10.

Located within the housing is a block 11 of non-conductive material and mounted thereon by means of a screw 12 are arms 13—13'; the latter being also of non-conductive material or fiber and have ends pivotally mounted on the screw and free ends yieldingly urged toward each other by the arms 14—14' of a U-shaped spring 15 which is mounted on the block 11 to inclose the arms 13—13'.

Mounted on the free ends of the arms 13—13' are binding posts 16—16', having heads 17—17' exposed at the inner faces of the arms and adapted to contact each other when the arms are brought together to close an electric circuit through the alarming system, and connected with the outer ends of the posts are circuit wires 18—19 which extend through a metal tube 20 to a metal housing 21, wherein they are connected through a battery 22 with a bell or other electrically operated signaling device 23, which will be operated on closing of an electric circuit through the system to give an alarm signifying that the vehicle is being used without authority.

Removably mounted between the free ends of the arms 13—13', to normally retain the arms and post heads 17—17' disengaged, is a key wedge 25, having arms 26—26' extending laterally therefrom to engage the ends of the arms 13—13' and mounted at its outer end by means of a screw eye 27, is a hook 28, which is adapted to extend through a cut out opening 29 in the post housing 6 and to seat in apertures 31 in the annular flange 32 fixed on the steering post 2, so that with the key in position, turning of the steering post in either direction will cause the wedge to be withdrawn from between the arms 13—13', to allow the heads 17—17' to engage each other and close a circuit through the alarm.

I also provide the block 11, at opposite sides of the key 25, with sockets 33, wherein the legs 34 of a fork 35 may be inserted to bear against the key arms 26—26' to prevent displacement of the wedge key when the alarm parts are not in use.

Assuming that the parts are so constructed and mounted on the vehicle, the owner when leaving the car, turns the steering post so that the guide wheels of the car are turned to one side; he then opens the door 8 of the housing 7 and removes the fork 35, to release the key 25 and inserts the hook 28 in the apertured flange 31 fixed on the post 2 and closes and locks the casing door 8.

Should a person attempt to use the vehicle, it is apparent that they would turn the steering post 2, which would cause the wedge key 25 to be withdrawn from between the arms 13—13', and the latter would be urged together by the spring 15 so that the post heads 17—17' would engage each other and an electric circuit closed through the battery and signal to warn the owner of the unauthorized use of his vehicle, and the alarm would continue to sound until the one with a key could open the housing door 8 and disconnect the circuit.

When the alarm is not in use, the wedge key 25, is held in position against displacement by jar or jolt by the insertion of the fork lock 34 in the socket 33.

It is apparent that by providing a sheet steel casing for the alarm parts, tampering therewith is prevented and a simple and effective alarm is provided.

Having thus described my invention, what I claim as new therein, and desire to secure by Letters-Patent, is—

1. In a motor vehicle, the combination with an inclosed steering post, battery and signaling device, of a switch controlled circuit through the battery and signaling device; said switch comprising pivotally mounted arms, contact points mounted on said arms, a spring bearing against said arms to urge said contact points together, a key removably mounted between said arms to normally prevent engagement of the contact points, a hook pivotally connected with said key, an annular flange fixed about the steering post having apertures therein for receiving said hook so that actuation of said post will unseat the said key to close a circuit through the system.

2. In a motor vehicle, the combination with a steering post, a battery and signaling device, of a switch controlled circuit through the battery and signaling device, a key for normally retaining said switch open, an annular flange fixed on said steering post having apertures therein, a hook connected with said switch key adapted to seat in said apertures, whereby actuation of the post will unseat said key to close said switch.

3. In a motor vehicle, the combination with a steering post, a battery and signaling device, of a switch controlled circuit through the battery and signaling device; said switch comprising a base member, arms pivotally mounted on said base, a spring for yieldingly urging said arms together, a key removably mounted between said arms to prevent contact of said points, a removable locking member adapted for retaining said key in functional position, a hook attached to said key and adapted for connecting with said steering post for the purpose set forth.

4. In a motor vehicle, the combination with a steering post, an electrically operated signaling device and a switch for controlling a circuit through the signaling device, of an annular, apertured flange inclosing the steering post, a key for normally retaining the switch in open position, and a hook attached to said key and adapted to seat in said apertured flange, for the purpose set forth.

In testimony whereof I affix my signature.

HIRAM A. BEALL.